(12) United States Patent
Ophey

(10) Patent No.: US 6,246,383 B1
(45) Date of Patent: Jun. 12, 2001

(54) HEAD-MOUNTED DISPLAY

(75) Inventor: Willem G. Ophey, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/238,765

(22) Filed: Jan. 28, 1999

(30) Foreign Application Priority Data

Jan. 28, 1998 (EP) .................................................. 98200240

(51) Int. Cl.[7] ...................................................... G09G 5/00
(52) U.S. Cl. .................................. 345/8; 359/13; 359/630
(58) Field of Search ............................ 345/7, 8; 359/13, 359/19, 618, 630–633, 642, 643, 583; 348/52–54

(56) References Cited

U.S. PATENT DOCUMENTS

| | | | |
|---|---|---|---|
| 3,867,633 | * | 2/1975 | Patrick et al. ........................ 250/334 |
| 4,530,602 | * | 7/1985 | Pomphrey, Jr. ....................... 356/138 |
| 5,035,474 | * | 7/1991 | Moss et al. ............................. 359/13 |
| 5,579,026 | * | 11/1996 | Tabata ....................................... 345/8 |
| 5,659,430 | * | 8/1997 | Togino .................................. 359/731 |
| 5,706,137 | * | 1/1998 | Kelly ..................................... 359/633 |
| 5,714,967 | * | 2/1998 | Okamura et al. .......................... 345/8 |
| 5,739,955 | * | 4/1998 | Marshall .............................. 359/631 |
| 5,764,363 | * | 6/1998 | Ooki et al. ........................... 356/364 |
| 5,801,885 | * | 9/1998 | Togino .................................. 359/630 |
| 5,982,343 | * | 11/1999 | Iba et al. .................................. 345/8 |
| 6,023,253 | * | 2/2000 | Taniguchi et al. ....................... 345/7 |

FOREIGN PATENT DOCUMENTS

96/05532   2/1996 (WO) ............................ G02B/27/01

* cited by examiner

*Primary Examiner*—Bipin Shalwala
*Assistant Examiner*—Ricardo Osorio
(74) *Attorney, Agent, or Firm*—Edward W. Goodman

(57) ABSTRACT

A head-mounted display includes an image display system which is common for two separate light channels. The head-mounted display further includes an optical system for projecting an image in a left and a right exit pupil of the head-mounted display. Each light channel is provided with imaging optics. The imaging optics of such a light channel have a hollow mirror and a semitransparent mirror or a hollow mirror, a semitransparent mirror and a folding mirror.

8 Claims, 6 Drawing Sheets

HEAD-MOUNTED DISPLAY

FIELD OF THE INVENTION

1. Background of the Invention

The invention relates to a head-mounted display comprising an image display system which is common for two separate light channels, and an optical system for projecting an image formed in the image display system in a right and a left exit pupil of the head-mounted display via a first and a second light channel, each light channel comprising imaging optics, the optical system comprising a first hollow mirror and a beam splitter being arranged between the image display system and the first hollow mirror.

2. Description of the Related Art

A head-mounted display of the type described in the opening paragraph is known from International Patent Application WO 96/05532, corresponding to U.S. Pat. No. 5,739,955. In this head-mounted device, a liquid crystalline image display panel is imaged on a left and right exit pupil of the head-mounted display by means of a field lens, a hollow mirror and two crossed reflecting surfaces via two light channels each comprising a folding mirror and an eyepiece consisting of three lenses. The exit pupils of the head-mounted display are assumed to coincide with the user's pupils. The image is ultimately imaged on the retina of both eyes of the user.

A drawback of the head-mounted display described in this application is that the large number of lenses and mirrors render the design relatively expensive. Instead of glass, inexpensive material such as, for example, synthetic resin material may be used. However, this has the drawback that the image realized thereby has a considerably poorer quality.

SUMMARY OF THE INVENTION

It is an object of the present invention to provide a head-mounted display having a relatively simple design, a low cost and a light weight.

To this end, the head-mounted display according to the invention is characterized in that the imaging optics of the first light channel comprise a second hollow mirror and a first splitting mirror, and the imaging optics of the second light channel comprise a third hollow mirror and a second splitting mirror, a lens being arranged between the image display system and the beam splitter.

The function of a three-lens eyepiece is herein ensured by the combination of a hollow mirror and a splitting mirror. It is further proposed to arrange a lens between the image display panel and the beam splitter in order to optimize the image quality. This lens is common for the two light channels. The assembly of the head-mounted display proposed is relatively simple. Moreover, the number of optical components is reduced. The field lens may also be dispensed with. The head-mounted display will thus have a considerably lighter weight.

Another embodiment of the head-mounted display according to the invention is characterized in that the imaging optics of the first light channel comprise a second hollow mirror and a first splitting mirror, and the imaging optics of the second light channel comprise a third hollow mirror and a second splitting mirror, a folding mirror being arranged between the splitting mirror and the hollow mirror in each light channel.

Instead of the lens in the common light path, a folding mirror is arranged in each light channel so as to optimize the image quality.

A preferred embodiment of the head-mounted display according to the invention is characterized in that the first splitting mirror of the beam splitter and the first splitting mirror of the first light channel have a given mutual position, and the second splitting mirror of the beam splitter and the second splitting mirror of the second light channel have a given mutual position, the splitting mirrors being rotatable about their own point of rotation, such that said positions are maintained.

The first splitting mirror of the beam splitter may enclose a given angle with the first splitting mirror of the light channel, for example, the first light channel into which the image is sent by the first splitting mirror of the beam splitter. The second splitting mirror of the beam splitter may enclose a given angle with the second splitting mirror of the light channel, for example, the second light channel into which the image is sent by the second splitting mirror of the beam splitter. The angle which they enclose may be, for example, 90°. In this configuration, the image display system is present between the light channels and the hollow mirror is present on the opposite side of the beam splitter. The first splitting mirror of the beam splitter and the first splitting mirror of the first light channel, on the one hand, and the second splitting mirror of the beam splitter and the second splitting mirror of the second light channel, on the other hand, may be, for example, parallel to each other. In this case, the hollow mirror is present between the light channels, and the image display system is present on the opposite side of the beam splitter.

By rotating the splitting mirrors about their own axis and maintaining the mutual position, as described above, of the splitting mirrors of the beam splitter in the light channels, the interpupilar distance (IPD) can be adapted to the user.

A further embodiment of the head-mounted display according to the invention is characterized in that the image display system comprises a reflective image display panel, in that the first hollow mirror is at least semitransparent, with an illumination system being present on the side of the first hollow mirror remote from the image display panel, and in that the illumination system and light channel comprise a polarizer, the polarizer of the illumination system being crossed with respect to the polarizers in the light channels.

An advantage of the use of a reflective image display panel is that the "blind" space between the pixels is much smaller than in a transmissive image display panel. This has the result that the pixels are stacked much more densely so that the required surface area for the same number of pixels is much smaller as compared with a transmissive image display panel. Consequently, the image display panel will be much less expensive.

A further embodiment of the head-mounted display according to the invention is characterized in that at least a number of curved optical surfaces of the head-mounted display are aspherical.

Imaging errors such as coma, astigmatism and curvature of the image field are considerably reduced thereby.

These and other aspects of the invention are apparent from and will be elucidated with reference to the embodiments described hereinafter.

DESCRIPTION OF THE PREFERRED EMBODIMENTS

Figure 1A:
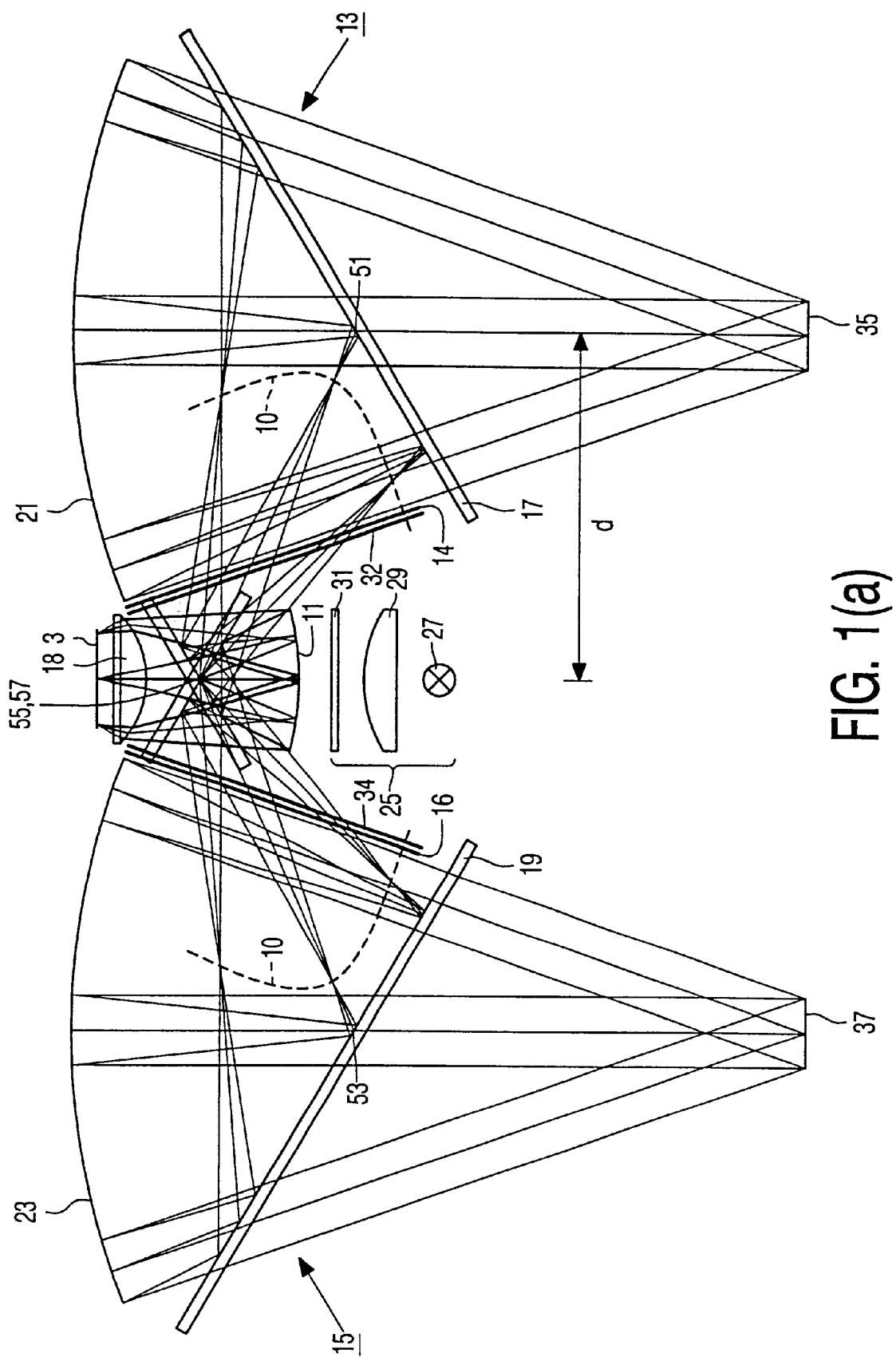
FIGS. 1(a) and 1(b) are plan views of embodiments of a head-mounted display according to the invention.

FIG. 1(a) is a diagrammatic plan view of a head-mounted display 1 according to the present invention. The head-mounted display 1 comprises an image display system 3. For the sake of simplicity, the image display system 3 is represented by a single image display panel. In practice, this will often be the case. The image display panel may be of the reflective or the transmissive type. The image display panel is, for example, a TN (twisted-nematic) liquid crystalline image display panel.

The image display panel may be illuminated with ambient light. However, an illumination system is preferably used because a higher light output can be realized and, consequently, a brighter image can be obtained. The position of the illumination system is determined by the type of image display panel and will be elucidated hereinafter.

Figure 2:
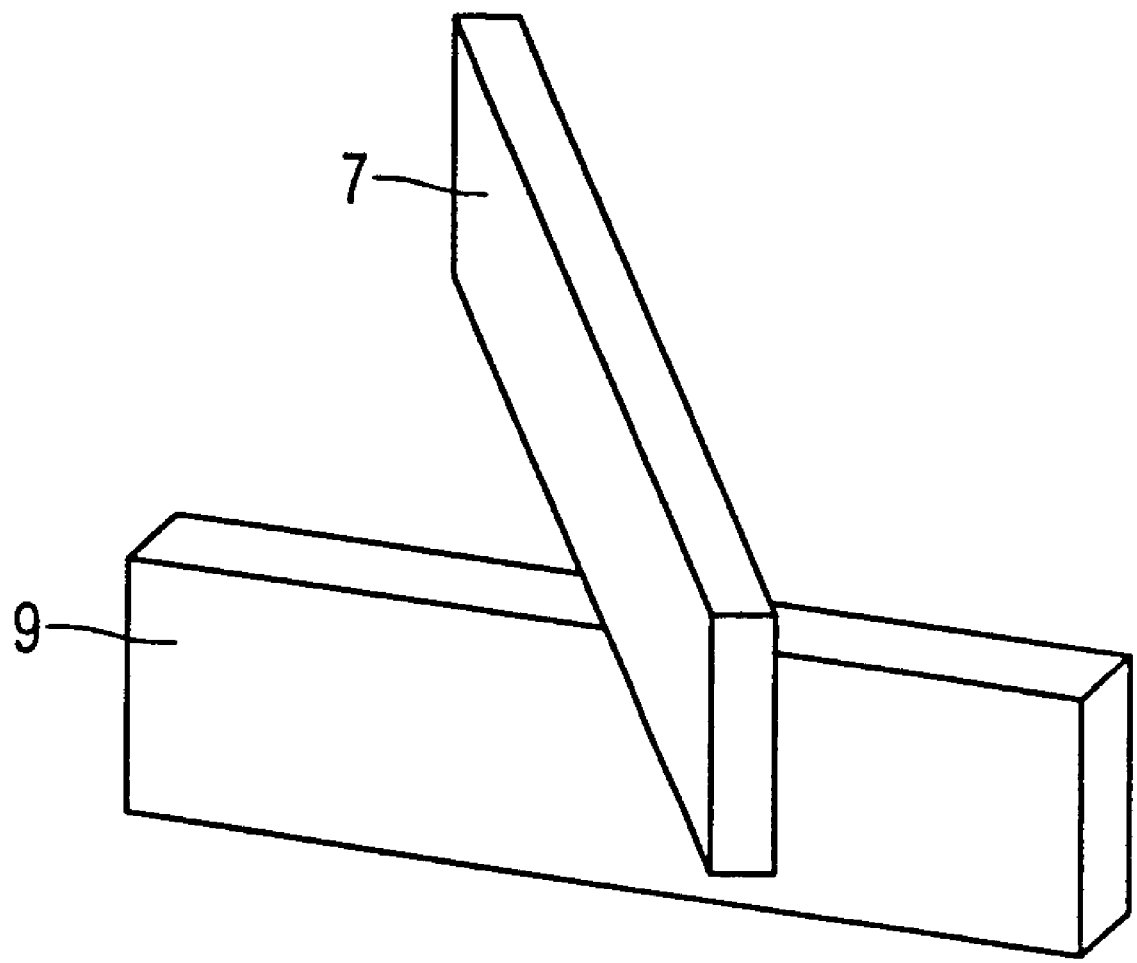
FIG. 2 shows an embodiment of the mirror combination.

The light from the image display panel 3 is incident on a beam splitter which consists of a first splitting mirror 7 and a second splitting mirror 9. The two mirrors 7, 9 enclose a given angle with each other. For example, they may be cross-wise stacked, as is shown in the embodiment of FIG. 2. The beam from the image display panel at least partly passes through the beam splitter towards a hollow mirror 11 on which the beam is reflected towards the beam splitter. The beam splitter subsequently splits the beam across two light channels 13, 15. The image comes from the image display panel which is common for the two light channels. An intermediate image of the image display panel, magnified or not magnified, is formed in each light channel 13, 15 at the area of the broken lines denoted by the reference numeral 10. The magnification of the intermediate image is determined by the hollow mirror 11 which functions as an imaging element. The intermediate image is subsequently imaged on the retina (not shown) of both eyes of the user. The light channels 13, 15 terminate at the exit pupils 35, 37 which are assumed to coincide approximately with the user's pupils. The light which reaches the light channels via the beam splitter without having gone through the hollow mirror can be blocked by means of blocking elements 14, 16, because this light does not contribute to the formation of the image but gives rise to disturbing light. The blocking elements should have such a shape that this reflected light is not blocked. In practice, this means that the blocking element in the vertical plane is complementary to the splitting mirror of the beam splitter which sends the unwanted light into the relevant light channel. The light converted first to an image via the hollow mirror will not be blocked by the blocking elements.

Each light channel 13, 15 comprises imaging optics. The imaging optics may be implemented in various ways. In a first embodiment according to the present invention, shown in FIG. 1(a), the imaging optics of each light channel comprise a splitting mirror 17, 19 and a hollow mirror 21, 23, respectively. The combination of the splitting mirror and the hollow mirror replaces the customary three-lens eyepiece. To optimize the image quality, it is proposed to arrange a lens 18 between the image display panel 3 and the beam splitter. The head-mounted display proposed in this application is considerably lighter, easier to assemble and less expensive than the head-mounted display hitherto known.

Figure 3:
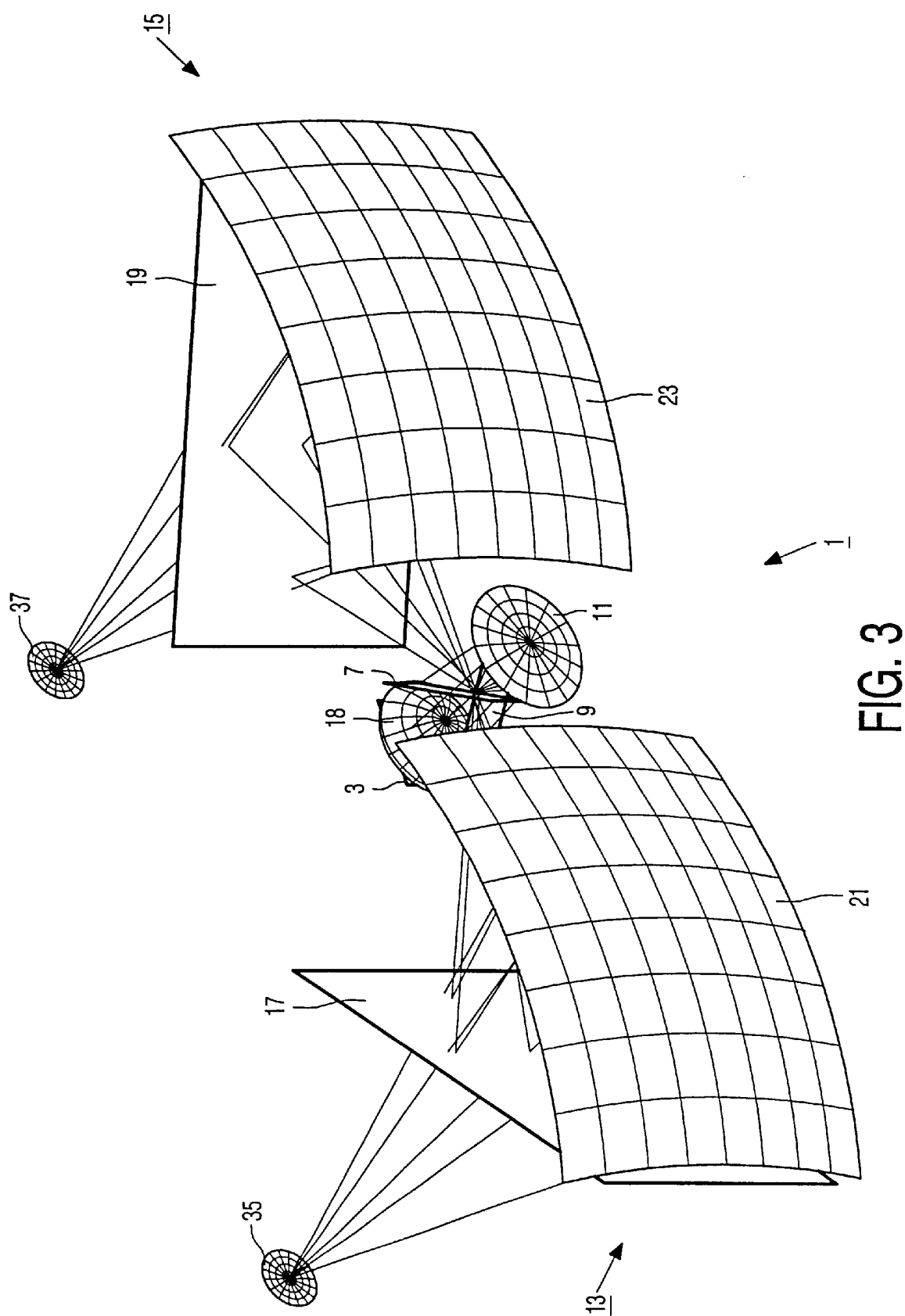
FIGS. 3, 4 and 5 are perspective views of some embodiments of a head-mounted display according to the invention.

A part of the light which will contribute to the formation of the image and is incident on the beam splitter, will be sent into a light channel by each splitting mirror 7, 9 of the beam splitter. The splitting mirror 7 of the beam splitter and the splitting mirror 19 of the light channel 15 into which the splitting mirror 7 of the beam splitter sends light contributing to the formation of the image, are preferably substantially parallel to each other. The same applies to the splitting mirrors 9 and 17. In this configuration, the hollow mirror 11 is present between the two light channels 13, 15, while the image display panel 3 is present on the opposite side of the beam splitter. The splitting mirrors 7 and 19, on the one hand, and the splitting mirrors 9 and 17, on the other hand, may enclose a given an angle, for example, an angle of 90° instead of being parallel to each other, but then the image display panel 3 and the hollow mirror 11 exchange places. The latter possibility is shown in a perspective view in FIG. 3.

In accordance with a further aspect of the present invention, it is proposed to render both the splitting mirrors of the beam splitter and the splitting mirrors in the light channels rotatable about their own axis, such that the mutual positions of the splitting mirrors 7 and 19 and the mutual positions of the splitting mirrors 9 and 17 are maintained. This means that the splitting mirrors 7 and 19, on the one hand, and the splitting mirrors 9 and 17, on the other hand, should either continue to enclose the same angle, or should remain substantially parallel to each other. Due to the rotation, it will be possible to adapt the interpupilar distance (IPD) to each user. The IPD may be varied, for example, between 55 and 70 mm. The splitting mirrors 7, 9, 17, 19 are rotatable about the points of rotation 51, 53, 55, 57. The points of rotation 55 and 57 coincide.

Figure 1B:
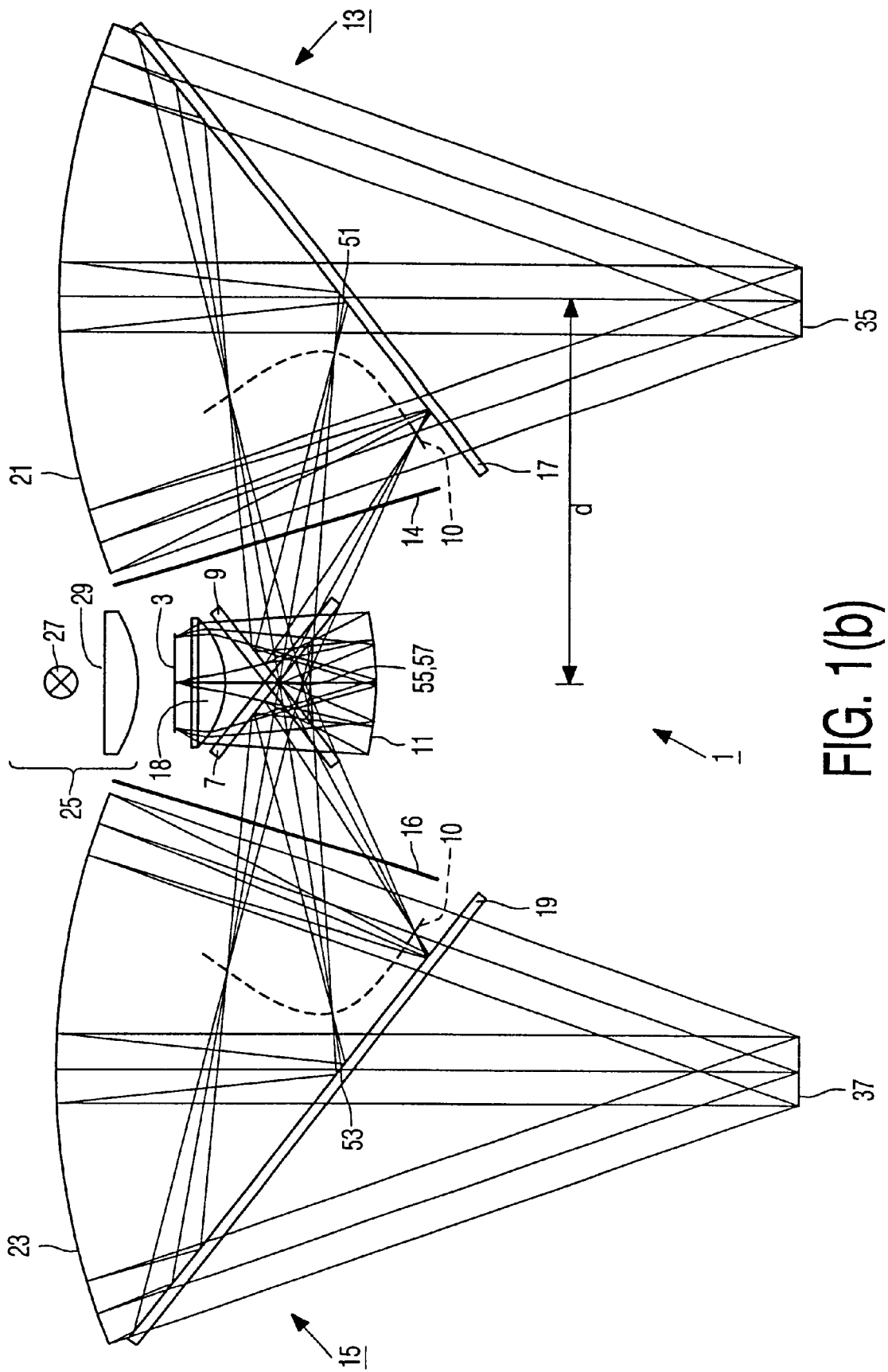

In FIG. 1(b), the splitting mirrors of the beam splitter 7, 9 mutually enclose a different angle than in FIG. 1(a). The same applies to the splitting mirrors 17, 19. Half the IPD is given by the distance d. The rotation of the different splitting mirrors results in the IPD in FIG. 1(a) being different from the IPD in FIG. 1(b).

A further difference between FIGS. 1(a) and 1(b) is that the image display panel in FIG. 1(a) is of the reflective type and the image display panel in FIG. 1(b) is of the transmissive type.

Figure 4:
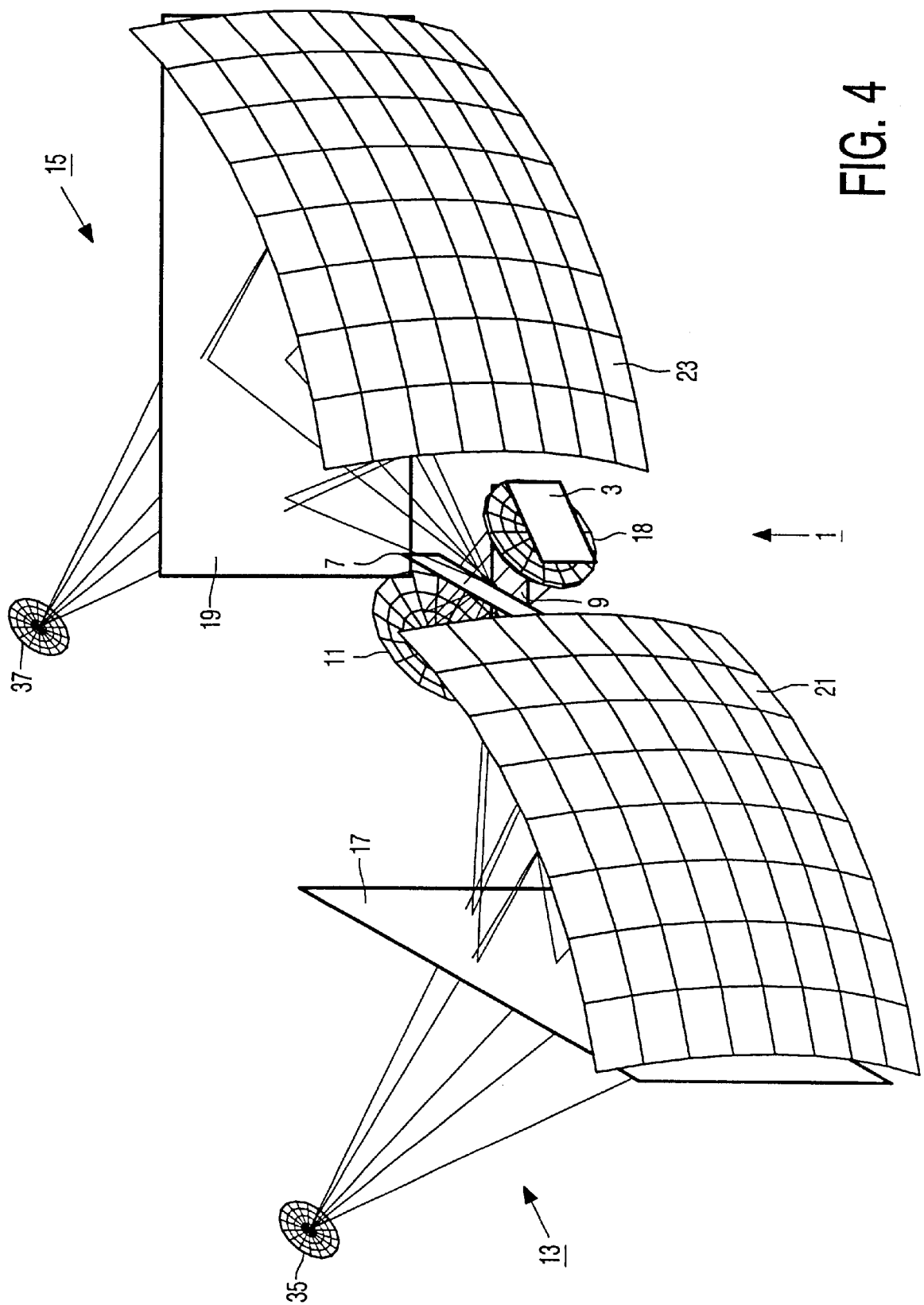

FIG. 4 is a perspective view of an embodiment, analogous to those shown in FIGS. 1(a) and 1(b). The type of image display panel is left outside consideration in this embodiment, so that the illumination system is not shown. The light coming from the image display panel and having also passed through the hollow mirror, is split across the two light channels 13, 15 by the beam splitter 7, 9. This light is sent towards the splitting mirrors 17, 19 and reflected at least partly on these mirrors towards the hollow mirror 21 in the first light channel 13 and the hollow mirror 23 in the second light channel 15. Reflection takes place again on each hollow mirror 21, 23. The light reflected on the hollow mirror 21 is at least partly passed by the splitting mirror 17 towards the exit pupil 35, and the light reflected on the hollow mirror 23 is at least partly passed by the splitting mirror 19 towards the exit pupil 37. The lens 18, which is common for the two light channels 13, 15, ensures that the image quality is optimized.

Figure 5:
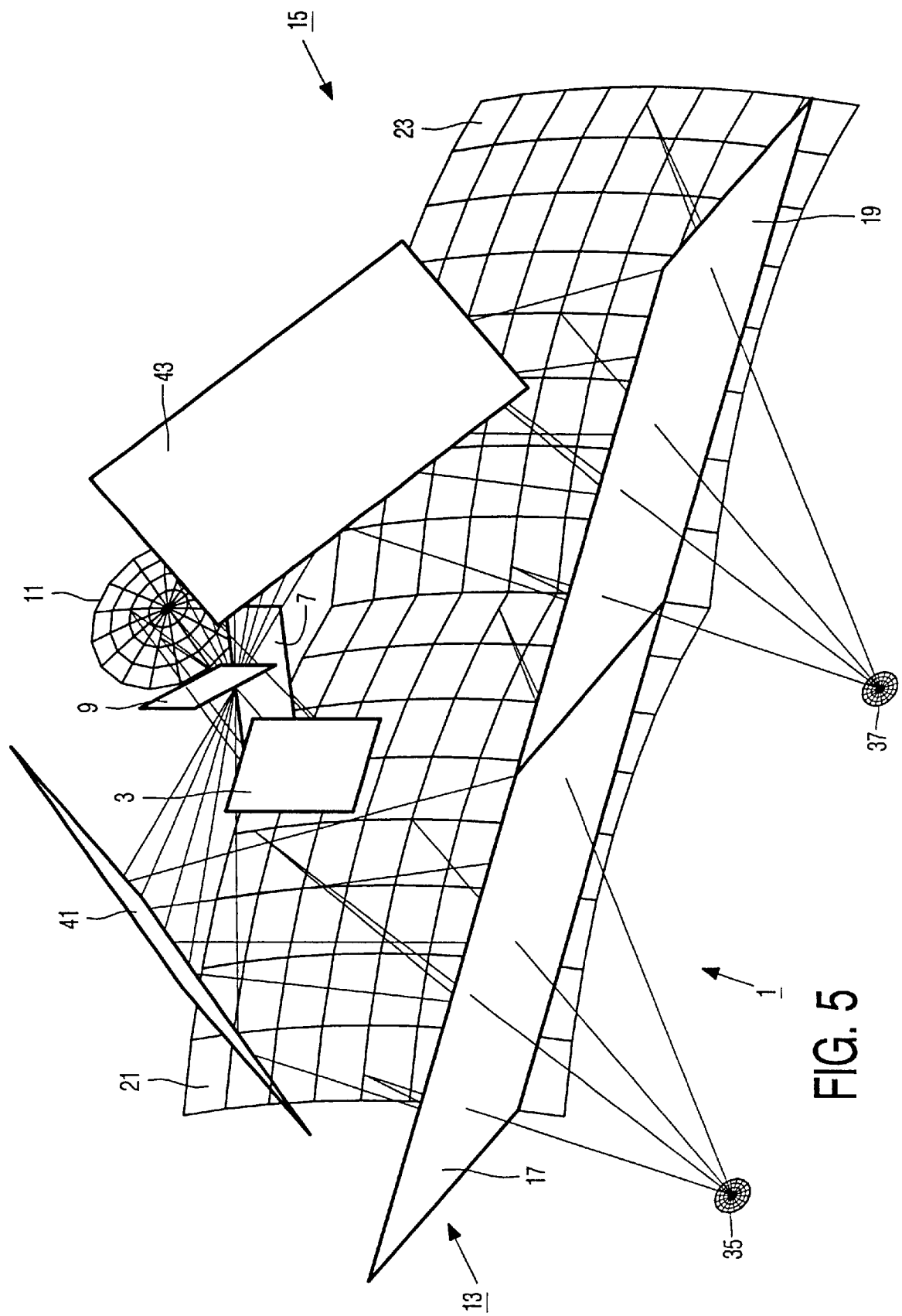

FIG. 5 is a perspective view of another embodiment of the head-mounted display according to the invention. Also in this Figure, the type of image display panel is left outside consideration. The light coming from the image display panel 3, which reaches the beam splitter 7, 9 via the hollow mirror 11 and thus comprises the image information, is split across the two light channels 13, 15 again. The light is first incident on the folding mirror 41 in the first light channel 13 and on the folding mirror 43 in the second light channel 15. The folding mirror 41 reflects the incident light towards the splitting mirror 17, and the folding mirror 43 reflects the incident light towards the splitting mirror 19. The splitting mirror 17 reflects at least a part of the incident light towards the hollow mirror 21, and the splitting mirror 19 reflects at least a part of the light towards the hollow mirror 23. The hollow mirror 21 reflects the light towards the splitting mirror 17 again, and the hollow mirror 23 reflects the light towards the splitting mirror 19 again. Each splitting mirror 17, 19 will at least pass a part of this incident light towards the relevant exit pupil. The lens 18, shown in FIG. 4 and being common for the two light channels, is replaced in this case by a folding mirror 41, 43 in each channel.

The curved optical surfaces of optical elements in the head-mounted display are preferably implemented as aspherical surfaces. Imaging errors such as curvature of the image field, coma and astigmatism are considerably reduced thereby.

As already stated hereinbefore, the position of the illumination system is determined by the type of image display panel, but also its composition is determined by the type of image display panel. If a transmissive image display panel is used, the illumination system 25 is present on the side of the image display panel 3 remote from the beam splitter 7, 9, as is shown in FIG. 1(b). The illumination system 25 comprises, for example, a light source 27 and a condensor lens 29. The light from the light source 27 is collimated by the condenser lens 29 and is subsequently incident on the image display panel 3. The light source may be, for example, a LED or an array of LEDs, or a gas discharge backlight unit. For a color image, it is important that the light source supplies "white" light.

If a reflective image display panel is used, the hollow mirror 11 is implemented, for example, as a semitransparent mirror and the illumination system is arranged on the side of the hollow mirror 11 remote from the beam splitter. FIG. 1(a) shows such an embodiment. The illumination system 25 may be constituted, for example, by a light source 27, a condensor lens 29 and a polarizer 31. The light from the light source 27 is collimated by the condensor lens 29 and subsequently linearly polarized by the polarizer 31, i.e., approximately half of it is absorbed. The linearly polarized light subsequently passes through the hollow mirror and partly through the mirror combination 7, 9 to the image display panel 3. After modulation and reflection by the image display panel, approximately half of the beam is sent into the light channel 13 and the other half of the beam is sent into the light channel 15. The blocking element 14 precedes a polarizer 32. The blocking element 16 precedes a polarizer 34. The directors of the two polarizers 32 and 34 have the same orientation, whereas the director of the polarizer 31 and the directors of the polarizers 32 and 34 are crossed. As a result, light which must give rise to dark pixels in the image will be blocked by the polarizers 32 and 34. The direction of polarization will be rotated of the light from pixels in the image display panel which have been activated and must give rise to bright pixels in the image. Consequently, this light will be passed entirely or partly by the polarizers, dependent on the grey level.

The polarizer 31 may be alternatively implemented as a reflective polarizer. The part of the light having the direction of polarization which is unwanted for the image display panel is then reflected towards the light source and may be recuperated by means of a λ/4 plate and a reflector (not shown). The λ/4 plate is then present between the light source and the polarizer and a reflector is present behind the light source. The λ/4 plate converts the linearly polarized light reflected by the polarizer into circularly polarized light. This circularly polarized light is incident on the reflector which will invert the direction of rotation of this light and reflect this beam. After reflection on this reflector, this light reaches the reflective polarizer again and will now be passed towards the image display panel.

In a reflective image display panel, the light source is preferably a red-green-blue LED. The image display panel is sequentially illuminated with the different colors, while the red, green and blue image consecutively appear on the image display panel, simultaneously with this illumination.

In the embodiment using a reflective image display panel, the blocking elements 14, 16 may, in principle, be dispensed with because the polarizers only pass light which contributes to the formation of the image. Since, in practice, the polarizers are not perfect, they may nevertheless be provided for the purpose of optimizing the image contrast. It is to be noted that blocking elements are not shown in the perspective Figures.

What is claimed is:

1. A head-mounted display comprising a first and a second light channel separate from each other, an image display system common to said first and second light channels, and an optical system for projecting an image formed in the image display system in a right and a left exit pupil of the head-mounted display via the first and second light channels, each light channel comprising imaging optics, the optical system comprising a first hollow mirror and a beam splitter, arranged between the image display system and the first hollow mirror, for directing light beams from said first hollow mirror into said first and second light channels, characterized in that the imaging optics of the first light channel only comprise a second hollow mirror and a first splitting mirror, and the imaging optics of the second light channel only comprise a third hollow mirror and a second splitting mirror, wherein said image is properly formed in said right and left exit pupils without using eye lenses, said optical system further comprising a lens arranged between the image display system and the beam splitter for optimizing the image quality.

2. A head-mounted display comprising a first and a second light channel separate from each other, an image display system common to said first and second light channels, and an optical system for projecting an image formed in the image display system in a right and a left exit pupil of the head-mounted display via the first and second light channels, each light channel comprising imaging optics, the optical system comprising a first hollow mirror and a beam splitter, arranged between the image display system and the first hollow mirror, for directing light beams from said first hollow mirror into said first and second light channels, characterized in that the imaging optics of the first light channel only comprise a second hollow mirror and a first splitting mirror, and the imaging optics of the second light channel only comprise a third hollow mirror and a second splitting mirror, a folding mirror arranged between the splitting mirror and the hollow mirror in each light channel for optimizing the image quality, wherein said image is properly formed in the left and right exit pupils without using eye lenses.

3. A head-mounted display as claimed in claim 1, characterized in that the beam splitter comprises a first beam splitting mirror for directing a light beam into said first light channel, and a second beam splitting mirror for directing a light beam into said second light channel, in which the first beam splitting mirror of the beam splitter and the first splitting mirror of the first light channel have a first given mutual position, and the second beam splitting mirror of the beam splitter and the second splitting mirror of the second light channel have a second given mutual position, the first and second beam splitting mirrors being rotatable about respective points of rotation thereby varying an angle between said first and second beam splitting mirrors, and the first and second splitting mirrors being rotatable about respective points of rotation along with the rotation of said first and second beam splitting mirrors, such that said first and second given mutual positions are maintained.

4. A head-mounted display as claimed in claim 1, characterized in that the image display system comprises a reflective image display panel, in that the first hollow mirror is at least semitransparent, with an illumination system being present on the side of the first hollow mirror remote from the image display system, and in that the illumination system and each light channel comprise a polarizer, the polarizer of the illumination system being crossed with respect to the polarizers in the light channels.

5. A head-mounted display as claimed in claim 1, characterized in that at least a number of curved optical surfaces of the head-mounted display are aspherical.

6. A head-mounted display as claimed in claim 2, characterized in that the beam splitter comprises a first beam splitting mirror for directing a light beam into said first light channel, and a second beam splitting mirror for directing a light beam into said second light channel, in which the first beam splitting mirror of the beam splitter and the first splitting mirror of the first light channel have a first given mutual position, and the second beam splitting mirror of the beam splitter and the second splitting mirror of the second light channel have a second given mutual position, the first and second beam splitting mirrors being rotatable about respective points of rotation thereby varying an angle between said first and second beam splitting mirrors, and the first and second splitting mirrors being rotatable about respective points of rotation along with the rotation of said first and second beam splitting mirrors, such that said first and second given mutual positions are maintained.

7. A head-mounted display as claimed in claim 2, characterized in that the image display system comprises a reflective image display panel, in that the first hollow mirror is at least semitransparent, with an illumination system being present on the side of the first hollow mirror remote from the image display system, and in that the illumination system and each light channel comprise a polarizer, the polarizer of the illumination system being crossed with respect to the polarizers in the light channels.

8. A head-mounted display as claimed in claim 2, characterized in that at least a number of curved optical surfaces of the head-mounted display are aspherical.

* * * * *